United States Patent
Wessells

(10) Patent No.: US 7,101,097 B2
(45) Date of Patent: Sep. 5, 2006

(54) APPARATUS AND METHOD FOR PAD PRINTING

(76) Inventor: Philip G. Wessells, 123 Cascade Dr., Mill Valley, CA (US) 94941

(*) Notice: Subject to any disclaimer, the term of this patent is extended or adjusted under 35 U.S.C. 154(b) by 0 days.

(21) Appl. No.: 10/628,749

(22) Filed: Jul. 28, 2003

(65) Prior Publication Data
US 2005/0025546 A1 Feb. 3, 2005

(51) Int. Cl.
B41J 3/14 (2006.01)
B41J 3/18 (2006.01)
B41J 3/28 (2006.01)
B41J 13/00 (2006.01)
B41J 13/10 (2006.01)

(52) U.S. Cl. .................. 400/48; 400/23; 156/344

(58) Field of Classification Search .............. 400/23, 400/24, 27, 28, 29, 34, 36, 48
See application file for complete search history.

(56) References Cited

U.S. PATENT DOCUMENTS

| | | | |
|---|---|---|---|
| 5,072,304 A * | 12/1991 | Abe et al. ............ 358/296 |
| 5,634,730 A | 6/1997 | Bobry | |
| 5,638,750 A * | 6/1997 | Sato .................. 101/126 |
| 5,926,682 A * | 7/1999 | Tomiki ............... 399/388 |
| 6,357,939 B1 | 3/2002 | Baron | |
| 6,499,840 B1 | 12/2002 | Day et al. | |
| 6,517,266 B1 | 2/2003 | Saund | |
| 6,707,571 B1 * | 3/2004 | Kurashina ........... 358/1.18 |
| 2002/0030830 A1 | 3/2002 | Day et al. | |
| 2002/0130925 A1* | 9/2002 | Koeda ................. 347/54 |
| 2003/0083967 A1 | 5/2003 | Fleming | |
| 2004/0056917 A1* | 3/2004 | Su et al. ............. 347/19 |

FOREIGN PATENT DOCUMENTS

| | | | | |
|---|---|---|---|---|
| EP | 0564297 A2 | | 6/1993 | |
| JP | 61095962 A | * | 5/1986 | |
| JP | 06297795 A | * | 10/1994 | |
| JP | 08133488 A | * | 5/1996 | |
| JP | 09058073 A | * | 3/1997 | |
| JP | 2000301775 A | * | 10/2000 | |
| JP | 2001071567 | | 3/2001 | |
| JP | 2002052760 A | * | 2/2002 | |
| JP | 2003081457 A | * | 3/2003 | |

(Continued)

OTHER PUBLICATIONS

Machine translation of JP 2000301775 to Hayao et al. from Japanese Patent Office website.*

(Continued)

Primary Examiner—Daniel J. Colilla
(74) Attorney, Agent, or Firm—Patent Law Offices - MEW

(57) ABSTRACT

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

19 Claims, 2 Drawing Sheets

FOREIGN PATENT DOCUMENTS

| | | |
|---|---|---|
| WO | WO 03/069453 A1 | 8/2003 |
| WO | WO 03/091032 A1 | 11/2003 |

OTHER PUBLICATIONS

Machine translation of JP 09058073 to Saka from Japanese Patent Office website.*

Machine translation of JP 2002052760 to Oikawa et al. from Japanese Patent Office website.*

Machine translation of JP 08133488 to Ozawa et al. from Japanese Patent Office website.*

Machine translation of JP 6-297795 to Matsumoto from Japanese Patent Office website.*

G4TECHTV, Review: Sony DPP-MP1 Digital Photo Printer, Feb. 15, 2002 (http://www.g4techtv.com/freshgear/features.19392/Review_Sony_DPPMP1_Digital_Photo_Printer_pg1.html).

Lisa Eccles, Digital Camera With Built-In Printer Looms On The Horizon, Jan. 22, 2001 (Electronic Design Web—http://www.elecdesign.com/Articles/Print.cfm?ArticleID=4262).

Revolutionary New Inkjet Technology Debuts in Canon U.S.A.'s N1000/N2000 Office Color Printers, Apr. 23, 2002 (http://www.businesswire.com/webbox/bw.042302/221132587.htm).

Blog Entry: Biz Stone—"Printer Idea" entry, Oct. 24, 2002 (http://www.bizstone.com/archive/2002_10_20_archive.htm).

Phoenix Maa, et. al., Redesign and Retrospective: A Redesign of the Palm V, operating system, and related applications, May 1, 2002. (Publication information unavailable).

PRINTDREAMS, The RMPT* white paper, Oct. 16, 2002 (http://www.printdreams.com/inside/whitepaper.pdf).

* cited by examiner

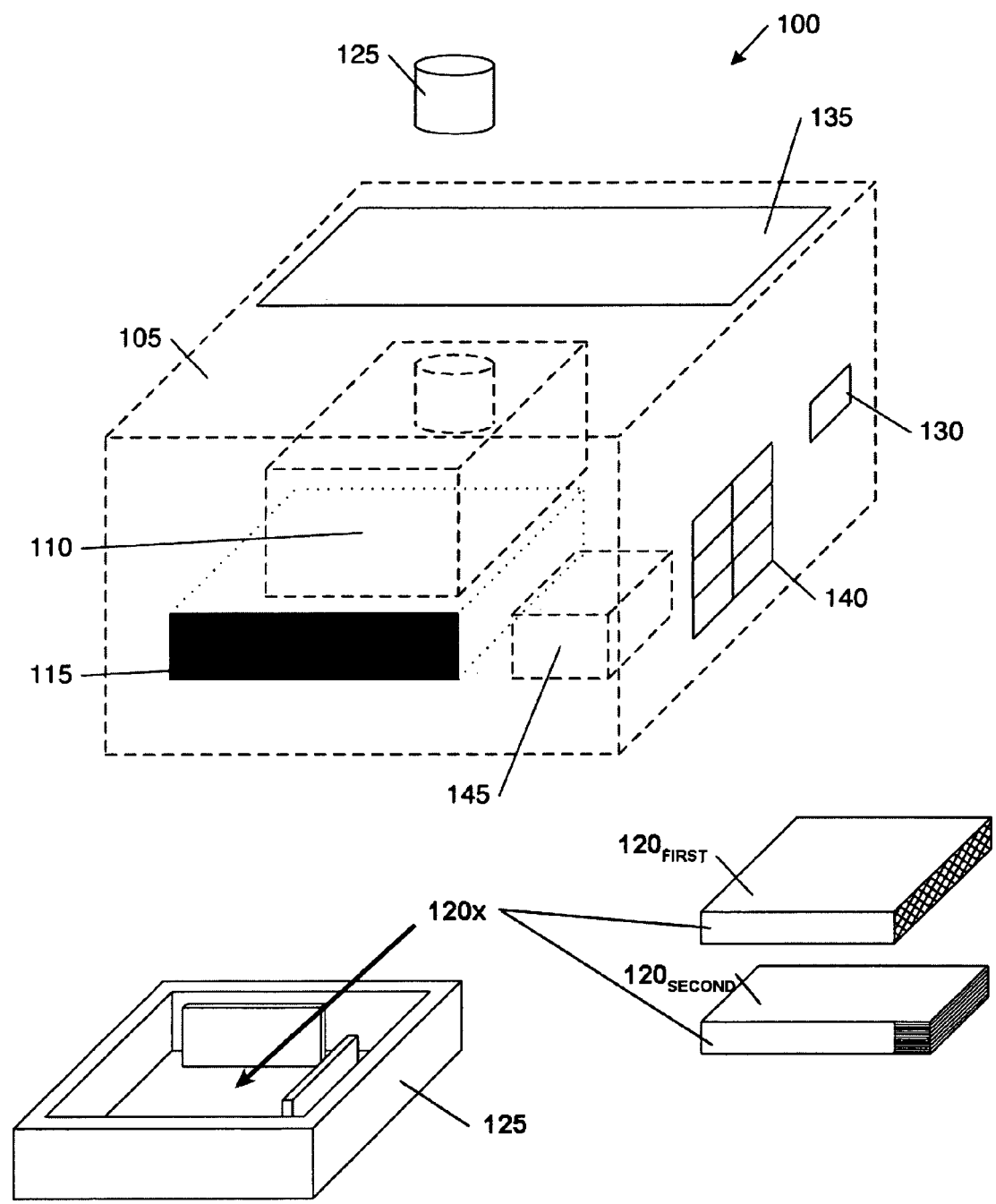
Figure_1

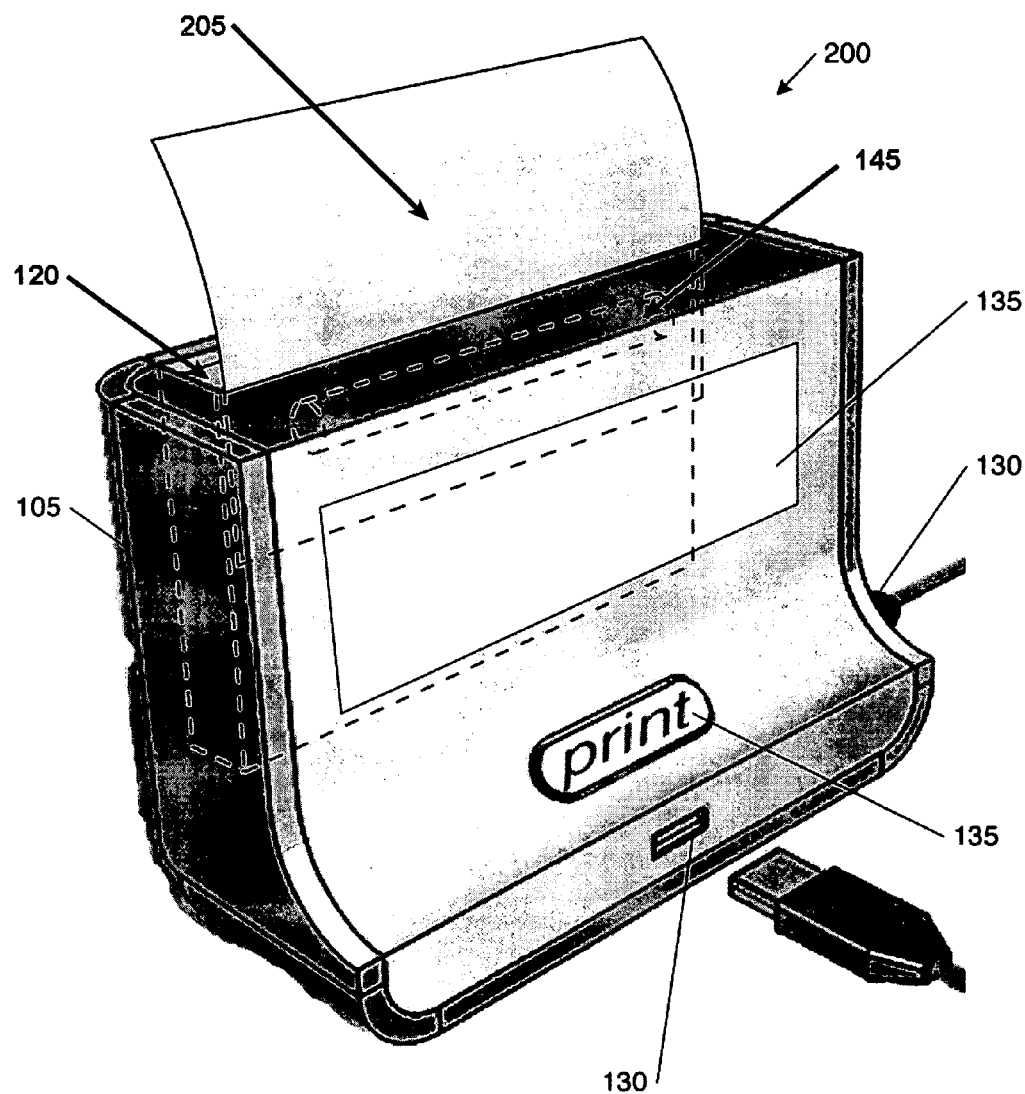
Figure_2

APPARATUS AND METHOD FOR PAD PRINTING

CROSS-REFERENCE TO RELATED APPLICATIONS

The present application is related to both application Ser. No. 10/628,820 entitled "APPARATUS AND METHOD FOR IMAGE CAPTURE AND PAD TRANSFER" and application Ser. No. 10/628,750 entitled "APPARATUS AND METHOD FOR ANIMATION PRINTER" and both filed on even date herewith. These applications hereby expressly incorporated by reference for all purposes.

BACKGROUND OF THE INVENTION

The present invention relates generally to printing systems, and more particularly to printing systems for transferring an image to a pad of transfer medium.

There are many types of printing systems available today. These systems include dot-matrix, thermal printers, electrostatic image transfer, ink ejectment, and the like. These systems are adapted for printing successive images on individual sheets of separate pages drawn from a paper reserve stack. There are many different mechanisms for extracting individual sheets and directing them to the image application portion of the printer. What these printers have in common is that the printing systems are adapted for accessing, controlling, routing and printing a single sheet at time.

Pads of note paper, such as Post-It® brand sticky note pads available from 3M Corporation of Minnesota, are well known. These pads include stacks of pages releasably secured to each other with a tacky adhesive that permits an individual page to removed from the pad and re-adhered to another surface. This feature of releasable securement to successive surfaces is a desirable trait of these products.

Currently to produce an image on a sticky note, a user either writes or otherwise applies some text or graphic element on the topmost page of the pad of sticky note. Later, the user removes the note to reposition it to the desired location. It would be advantageous to use a printing system to apply the element to the sticky note page. However, the current printing systems are incapable of printing on such a pad. 3M offers a solution for printing on a preformed matrix of single layer note pages arranged in a standard 8"×11" format for running through a conventional printer.

This solution has disadvantages in that it requires access to, and use of, a full-size printer and associated computer system to reproduce the element on the note. Also, the user has to obtain pages of the special format, as well as special software for use in cooperation with the computer system operating the printer.

SUMMARY OF THE INVENTION

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

The preferred embodiment of the present invention is provided as a stand-alone system for receiving a pad of a plurality of transfer media and for transferring an image to one of the transfer media. Additionally, the printer may be incorporated into a portable image capturing device to directly transfer a captured image onto the pad. The one transfer medium may be printed while attached, or in some implementations, after being stripped from the pad. In some implementations, a print registration system ejects a printed medium after printing, or a user removes the pad after printing, removes the printed medium, and then reinserts the pad. Virtually any image may be transferred, limited by the image transfer engine, the image source quality and pad size. Examples include maps, notes, photos, daily calendar with appointments, to-do items, shopping lists, checklists, and phone numbers.

These and other novel aspects of the present invention will be apparent to those of ordinary skill in the art upon review of the drawings and the remaining portions of the specification.

BRIEF DESCRIPTION OF THE DRAWINGS

FIG. 1 is a block perspective view a preferred embodiment of the present invention for a pad printing system; and FIG. 2 is a perspective view of the preferred embodiment implemented in a desktop printing system.

DESCRIPTION OF THE SPECIFIC EMBODIMENTS

FIG. 1 is a block perspective view a preferred embodiment of the present invention for a pad transfer system 100. Transfer system 100 includes a housing 105, an image trasnsfer engine 110, and a transfer registration system 115 for receiving a pad 120x (from a first type of pad $120_{FIRST}$ and a second type of pad $120_{SECOND}$) using a cartridge 125. Cartridge 125 includes sliders (as well known in the art) for adjusting to a varying periphery of pad 120x and appropriately registering pad 120x to engine 110. Pad $120_{FIRST}$ is a pad having adhesive adhered to one edge of each sheet, and pad $120_{SECOND}$ is pad having adhesive adhered between successive layers proximate one edge. Hereafter, any pad 120x will be subsitutably referred to as pad 120.

Housing 105 contains the elements of pad transfer system 100. Housing 105 preferably also may be integrated into other devices(either physically or logically) to provide functionality such, as for example, image capture, image storing, and/or image transmission. Pad transfer system 100 may also be enabled to work cooperatively with an image capture system, with the image capture system physically or logically integrated with pad transfer system 100.

Image transfer engine 110 is a device for applying a text or graphic element onto pad 120 when pad 120 is registered within transfer registration system 115. Image transfer engine 110 may include conventional printing systems such as, for example, a laser printer, an inkjet printer, a thermal printer, a dot-matrix printer, or the like. Image transfer engine 110 may include imaging systems like stenciling and stamping as well. Therefore image transfer engine 110 of the preferred embodiment denotes a system that imparts a perceptible image onto or into one of a transfer medium of pad 120, and the term print is used in a generic sense to include all such transfer processes.

In some implementations, image transfer engine 110 uses a printing system that consumes a print resource during the transfer process (e.g., toner in a laser printer or ink in an inkjet printer). Pad printing system 100 may provide for replaceable resource sources 125 (e.g., an ink cartridge or toner cartridge) or provide for replacement of a complete image transfer engine 110 that is new or refurbished with a fresh supply of the resource.

Pad printing system 100 includes a processing unit for controlling the functions, and includes memory for storing program instructions and, in some cases, images in a format suitable for use with image transfer engine 110. This memory may include portions that are volatile, non-volatile or some combination. In some implementations, pad printing system 100 includes one or more image access ports 130, coupled to the controller, memory, or directly to image transfer engine 110. Image access port 130 is a receiver/receptacle adapted to operatively mate with memory modules storing one or more images for application using pad printing system 100, or for coupling to another device or source of images, such as, for example, a computing system, a camera, a scanner, a video camera, or the like. Some implementations and embodiments of the present invention include rechargeable batteries to power the transfer functions. Access port 130 may be integrated into a docking station for receiving, storing, powering and otherwise interfacing to the image transfer system or to an image capture system, or both. The docking system may be used for systems lacking the rechargeable batteries.

In some implementations of the preferred embodiment, pad transfer system 100 includes a display 135 for reproducing a facsimile of an image to be transferred, or transferred by, image transfer engine 110. Display 135 also provides feedback during control or operation functions. A portion of display 135 provides feedback regarding the status of the image transfer process, such as that system 100 is ready to begin transfer, transfer is ongoing, and/or transfer has completed.

A control system 140 includes one or more buttons coupled to the controller for actuating an image transfer process, selecting an image for transfer, accessing images through access port 130. In the preferred embodiment, control system 140 includes a "PRINT" button, the actuation of which initiates an image transfer process.

Print registration system 115 receives pad 120 and positions one transfer medium of the plurality of transfer media at a location to cooperate with image transfer engine 110 in the image transfer process. Pad 120 of the preferred embodiment is a stack of uniformly sized transfer medium elements (e.g., sheets of paper, though other substrates or materials are possible, including Mylar film, decals, etc.) releasably secured to each other. In the preferred embodiment, pad 120 is a stack of sticky note pads, like the Post-It® sticky note pad product. Registration system 115 locates the topmost transfer medium at the print position and holds pad 120 during the image transfer process.

In some embodiments, registration system 115 may position the bottommost transfer medium, or some other portion of pad 120. Registration system 115 may include adapter/cartridge 125 for holding pad 120 during image transfer. Such an adapter/cartridge is configurable to permit registration of different sized pads 120 (size differing in thickness and/or peripheral dimensions). In this configuration, pad 120 is placed within cartridge 125 and cartridge 125 registers pad 120 in appropriate fashion to engine 110.

Registration system 115 also includes, in some implementations, a stripper 145 for pulling a single transfer medium off pad 120, either before image transfer or after. Stripper 145, depending upon its functions, may be implemented in numerous different ways. A simple implementation includes a blade or roller that slides between a sheet and the remainder of the pad to lift, separate and remove the sheet.

It is understood that pad print system 100 may also be implemented as a simple device without the display, access ports, and controls. When inserting pad 120 sufficiently far into registration system 115, image transfer begins. An LED is illuminated while the transfer process is in progress. When the LED extinguishes, pad 120 is removed with one of the pages bearing the transfer image.

In operation, a user loads pad 120 into registration system 115 that in turn locates one of the transfer medium at the desired location. A user selects a particular image for transfer, either from internal memory or from an external source through image access port 130. The selected image is viewed on display 135, and the user actuates the "PRINT" button to initiate the transfer system. When the transfer process is completed, the transfer medium, either individually or as part of pad 120, is removed from pad printing system 100.

FIG. 2 is a perspective view of the preferred embodiment implemented in a desktop printing system 200 including a roller as ejection mechanism 145 shown in FIG. 1. In the configuration shown in FIG. 2, a single element 205 of the transfer medium is ejected after image transfer. In other configurations, element 205 may be separated and removed prior to image transfer. Desktop printing system 200 is configured as shown in FIG. 1, including having two access ports 130 for accessing images: one coupled to an imaging system (e.g., a camera ) and the other to a computing system. System 200 has two operating modes: vertical as shown that operates like a "toaster" and a horizontal mode (not shown) that operates as a "toaster oven."

As used herein, pad 120 includes collections of print media not only secured to each other using a semi-tacky re-attachable adhesive (e.g., Post-It® notes) but also to releasable securement systems such as edge-applied adhesive laminate and other binding systems that hold the media together while permitting one or more medium elements to be detached.

The above-described arrangements of apparatus and methods are merely illustrative of applications of the principles of this invention and many other embodiments and modifications may be made without departing from the spirit and scope of the invention as defined in the claims.

These and other novel aspects of the present invention will be apparent to those of ordinary skill in the art upon review of the drawings and the remaining portions of the specification.

What is claimed is:

1. An image transfer apparatus, comprising:
    a housing;
    a transfer engine, within said housing, for transferring an image to a transfer medium when said transfer medium is located at a transfer position; and
    a transfer medium registration system, coupled to said transfer engine, for positioning a pad including a plurality of transfer media releasably secured to one another, wherein said transfer registration system locates one of said transfer media at said transfer position, and wherein said transfer registration system cooperates with a media stripper for removing said located one transfer medium from said pad, said media stripper disposed within said housing during a transfer of said image to said one medium of said transfer media wherein said transfer registration system ejects said removed transfer medium from said housing.

2. A transferring method, the method comprising:
positioning a pad at a transfer position of a transfer engine using a pad-storing cartridge repeatably removable from a housing containing said transfer engine, said pad including a plurality of transfer media releasably secured to one another; and
transferring an image to one of said transfer media positioned at said transfer position; and
removing said one of said transfer media using a media stripper proximate to a print registration system including said pad-storing cartridge, said media stripper mounted within said housing.

3. The transferring method of claim 2 wherein said one of said transfer media is releasably secured to said pad when said image is transferred.

4. The transferring method of claim 2 wherein said one of said transfer media is detached from said pad when said image is transferred.

5. A transferring method, the method comprising:
positioning a pad at a transfer position of a transfer engine, said pad including a plurality of transfer media releasably secured to one another; and
transferring an image to one of said transfer media positioned at said transfer position, wherein said one of said transfer media is detached from said pad when said image is transferred using a media stripper proximate to a print registration system, said media stripper disposed within said housing during a transfer of said image to said one of said transfer media.

6. A transferring method, the method comprising:
(a) positioning a pad at a transfer position of a transfer engine, said pad including a plurality of transfer media releasably secured to one another;
(b) transferring an image to one of said transfer media positioned at said transfer position; and
(c) removing said located one transfer medium from said pad using a media stripper proximate to a print registration system, said media stripper disposed within said housing during a transfer of said image to said one of said transfer media.

7. The transferring method of claim 6 wherein said removing step (c) is performed after said transferring step (b).

8. The transferring method of claim 6 wherein said removing step (c) is performed prior to said transferring step (b).

9. An image transfer system, comprising:
a pad including a plurality of uniformly-sized stacked transfer medium elements releasably secured to each other;
a housing;
a transfer engine, within said housing, for transferring an image to a particular one transfer medium element of said pad when said particular one transfer medium element is located at a transfer position; and
a transfer medium registration system, coupled to said transfer engine, for positioning said pad, wherein said transfer registration system locates said particular one transfer medium element at said transfer position, and wherein said transfer medium registration system includes a cartridge for storing said pad during operation and wherein said transfer medium registration system cooperates with a media stripper for removing said one of said transfer media, said media stripper disposed within said housing during a transfer of said image to said particular one transfer medium element.

10. The system of claim 9 wherein said cartridge is adaptable for differing dimensioned pads.

11. The system of claim 9 wherein said particular one transfer medium element is a top-most transfer medium of said pad.

12. The system of claim 9 wherein said particular one transfer medium element is a bottom-most transfer medium of said pad.

13. An image transfer system, comprising:
a pad including a plurality of uniformly-sized stacked transfer medium elements releasably secured to each other;
a housing;
a transfer engine, within said housing, for transferring an image to a particular one transfer medium element of said pad when said particular one transfer medium element is located at a transfer position; and
a transfer medium registration system, coupled to said transfer engine, for positioning said pad, wherein said transfer registration system locates said particular one transfer medium element at said transfer position, and wherein said transfer registration system includes a media stripper for removing said particular one transfer medium element from said pad, said media stripper disposed within said housing during a transfer of said image to said particular one transfer medium element.

14. The system of claim 13 wherein said media stripper removes said particular one transfer medium element prior to image transfer.

15. The system of claim 14 wherein said particular one transfer medium element is a top-most transfer medium of said pad.

16. The system of claim 14 wherein said particular one transfer medium element is a bottom-most transfer medium of said pad.

17. The system of claim 13 wherein said media stripper removes said particular one transfer medium element after image transfer.

18. The system of claim 17 wherein said particular one transfer medium element is a top-most transfer medium of said pad.

19. The system of claim 17 wherein said particular one transfer medium element is a bottom-most transfer medium of said pad.

* * * * *